Aug. 5, 1958

E. B. OLSON 2,845,832

RIVET FORMED FROM A FLAT METAL BLANK

Filed April 5, 1955

INVENTOR.
Elof B. Olson
BY Robert L. Kahn

United States Patent Office 2,845,832
Patented Aug. 5, 1958

2,845,832

RIVET FORMED FROM A FLAT METAL BLANK

Elof B. Olson, Chicago, Ill., assignor to Oak Mfg. Co., Chicago, Ill., a corporation of Illinois Application April 5, 1955, Serial No. 499,367

4 Claims. (Cl. 85—38)

This invention relates to a blind rivet and makes possible a rivet construction requiring force to be exerted upon one end of the rivet only for the purpose of locking the rivet into final position.

As is well known, conventional rivets require a hammer or other means at one end of the rivet and an anvil at the other end of the rivet for spreading the rivet to lock the same into position. Where a rivet is accessible at both ends, such conventional rivets are satisfactory. However, there are instances where fastening means are desirable but the type of fastening means is limited because of the difficulty of or complete lack of access to one end of the fastening means. A construction embodying the present invention makes possible riveting of two parts where access to one end of the rivet is unnecessary for locking or spreading the rivet.

For a thorough understanding of the invention, both in its broader and more limited aspects, reference will now be made to the drawings wherein an exemplary embodiment is illustrated. It is understood, however, that variations may be made without departing from the scope of the invention except as defined by the appended claims.

Referring now to the drawings, Figure 1 is a perspective elevation of a rivet embodying the present invention.

Figure 1:
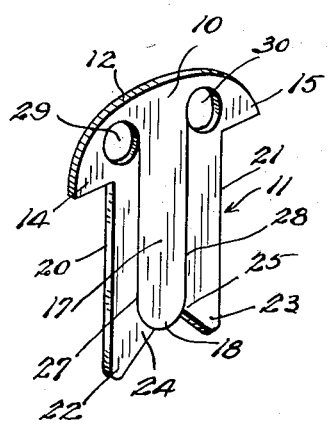

The rivet embodying the present invention is made of malleable metal or alloys which may be readily worked, such as for example brass, soft iron, copper, aluminum, or the like. The rivet is flat and comprises head portion 10 and body portion generally indicated by 11. Head portion 10 is preferably rounded or otherwise shaped to provide a convex edge portion 12. Head 10 is long enough transversely of the rivet to provide shoulders 14 and 15.

Rivet body 11 comprises stem 17 extending longitudinally of the rivet from head 10, stem 17 terminating in end portion 18. Portion 18 of the stem is shown as rounded but may be beveled or have any desired shape. This is particularly true of the stem end portion which is between finger projections 24 and 25. Laterally disposed of stem 17 are finger portions 20 and 21 terminating in finger tips 22 and 23 respectively. Finger tips 22 and 23 extend beyond end 18 of the stem and have inwardly projecting portions 24 and 25 which normally tend to hug end portion 18 of stem 17.

Fingers 20 and 21 and stem 17 are originally of one piece of flat metal stock, the metal being fractured along lines 27 and 28. Relief apertures 29 and 30 in head 10 are provided, cleavage lines 27 and 28 extending up into head 10 and terminating at relief apertures 29 and 30.

Figure 2:
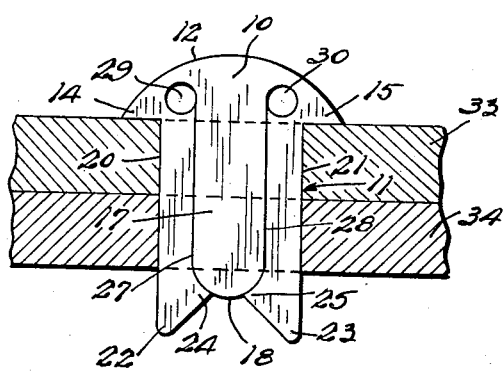
Figure 2 is a side elevation of the rivet illustrated in Figure 1, the rivet being disposed in position just prior to spreading.

Referring to Figure 2, the rivet illustrated in Figure 1 is disposed in rectangular aperture 32 in pieces 33 and 34 which are to be riveted together. Both pieces are provided with registering apertures through which the body of the rivet is passed. Shoulders 14 and 15 extend beyond the ends of apertures 32 and are anchored against the top surface of piece 33.

Figure 3:
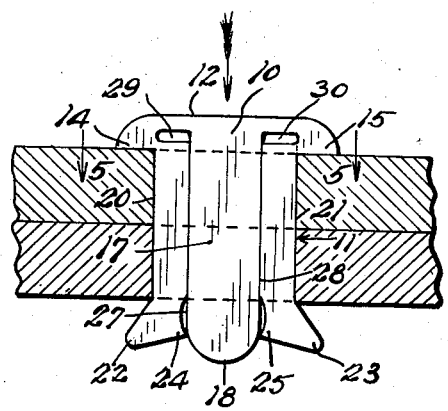
Figure 3 is a view similar to Figure 2 but shows the rivet in spread or locked position.
Figure 4:
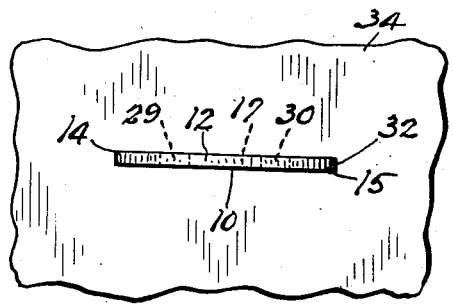
Figure 4 is a top view looking down upon the rivet as illustrated in Figure 2.
Figure 5:
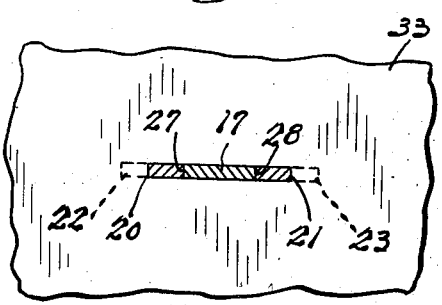
Figure 5 is a sectional view on line 5—5 of Figure 3.

In order to lock or spread the rivet, a hammer blow upon the head of the rivet is sufficient. As illustrated in Figure 3, the convex portion of the head is collapsed, relief holes 29 and 30 facilitating this collapse of the head. Collapse of head 10 results in downward movement of stem 17. End 18 of the stem bears against finger projections 24 and 25 and causes the same to be spread laterally. Finger tips 22 and 23 are thus caused to extend laterally beyond the sides of fingers 20 and 21 respectively. By proper shaping of end portion 18 of the stem, and the shape of finger tip portions 22 and 23, a desired and effective spreading of the finger tips will occur and provide a satisfactory locking action for the rivet.

While a convex rivet head is desirable, it is clear that any shape may be used. A convex head as illustrated is advantageous since a hammer is the only tool necessary for setting the rivet.

It may be possible under certain conditions to omit relief apertures 29 and 30. In such case, the force necessary to spread the rivet would be substantially greater. By virtue of relief apertures 29 and 30, room is provided for metal to flow so that the stem may be translated longitudinally of the rivet without disturbing the shoulder construction of the rivet and also without requiring excessive force for spreading the rivet.

What is claimed is:

1. A blind rivet comprising a flat malleable metal blank having a thickness which is small in comparison to the width of the rivet so that the blank may be made of flat stock, said blank having a head and elongated body, said head consisting substantially of the flat metal stock of which the blank is made with the shape of the head being determined solely by removal of surplus metal, said head being compact and having shoulders extending laterally beyond the sides of the body, said shoulders being adapted to overlie the outer surface of the material being riveted said body comprising a central stem and adjacent fingers laterally disposed along said stem, there being a line of cleavage between the stem and fingers to the end of the finger, said stem having a free convex shaped end, said fingers having tips extending beyond the stem end and said fingers having inwardly disposed projections following the contours of the adjacent stem end, said stem and adjacent fingers being of one piece of metal with said fingers and stem in contact with each other along the line of cleavage and the line of cleavage extending up into the head, said rivet being adapted to be hit upon its head to cause the head to collapse and push the stem longitudinally with the stem end cooperating with the finger projections to spread the ends of the fingers and cause the finger tips to move away from the stem and spread outwardly and provide locking portions.

2. The construction according to claim 1 wherein said head has two relief holes through the blank and wherein the lines of cleavage between the fingers and central stem extend to the holes.

3. The construction according to claim 2 wherein said head has a convex shape.

4. The construction according to claim 3 wherein the stem end is rounded.

(References on following page)

References Cited in the file of this patent

UNITED STATES PATENTS

| | | |
|---|---|---|
| 964,226 | Farrand | July 12, 1910 |
| 1,813,892 | Jones | July 7, 1931 |
| 2,023,095 | Parker | Dec. 3, 1935 |
| 2,222,338 | Roberts | Nov. 19, 1940 |
| 2,594,840 | Allison | Apr. 29, 1952 |
| 2,611,166 | Wiley | Sept. 23, 1952 |
| 2,748,645 | Peckham et al. | June 5, 1956 |

FOREIGN PATENTS

| | | |
|---|---|---|
| 811,638 | Germany | Aug. 23, 1951 |